(12) United States Patent
Luxem et al.

(10) Patent No.: US 6,768,015 B1
(45) Date of Patent: Jul. 27, 2004

(54) METHOD OF MAKING ALKYL ESTERS USING PRESSURE

(75) Inventors: Franz J. Luxem, Palatine, IL (US); William M. Troy, Woodridge, IL (US)

(73) Assignee: Stepan Company, Northfield, IL (US)

( * ) Notice: Subject to any disclaimer, the term of this patent is extended or adjusted under 35 U.S.C. 154(b) by 0 days.

(21) Appl. No.: 10/639,382

(22) Filed: Aug. 12, 2003

Related U.S. Application Data

(60) Provisional application No. 60/471,272, filed on May 16, 2003.

(51) Int. Cl.[7] ................................................ C11C 1/00
(52) U.S. Cl. ...................................... 554/169; 560/205
(58) Field of Search ........................... 554/169; 560/205

(56) References Cited

U.S. PATENT DOCUMENTS 5,151,547 A * 9/1992 Sato et al. ................... 560/205
5,302,746 A    4/1994 Koono et al. ................ 560/205
2001/0042340 A1  11/2001 Tateno et al. ................. 44/388

FOREIGN PATENT DOCUMENTS

| EP | 1126011 A3 | 8/2001 | ............. C11C/3/00 |
| EP | 1126011 A2 | 8/2001 | ............. C11C/3/00 |
| EP | 1211236 A1 | 8/2002 | ........... C07C/67/08 |

* cited by examiner

*Primary Examiner*—Deborah D. Carr
(74) *Attorney, Agent, or Firm*—McAndrews, Held & Malloy, Ltd.

(57) ABSTRACT

A method for making alkyl esters, or methylester specifically, such as biodiesel, from an oil source is described. The method involves simultaneously reacting the free fatty acids and glycerides of the oil source with methanol, under pressure up to 500 psia, into fatty acid alkyl esters. The conversion is catalyzed by an acid at temperatures between about 80° C. to about 200° C.

10 Claims, 7 Drawing Sheets

METHOD OF MAKING ALKYL ESTERS USING PRESSURE

This application claims priority benefits under 35 U.S.C. 119(e) from U.S. Provisional Application No. 60/471,272, filed May 16, 2003. The specification and claims of each patent and patent application identified in this paragraph are hereby incorporated herein by reference to provide continuity of disclosure.

BACKGROUND OF THE INVENTION

Alkylesters, or methylester specifically, such as biodiesel, are a clean-burning replacement for conventional petroleum-based diesel. Biodiesel may be made from natural, renewable sources such as new or used vegetable oils and animal fats. Biodiesel is fatty acid alkyl esters (typically being $C_{16}$ to $C_{18}$) and can generally be burned in combustion-ignition engines as a direct replacement for petroleum-based diesel. Aside from providing the benefit that biodiesel may be generated from renewable sources, biodiesel also provides the added benefit of decreased emissions from its combustion as compared to the combustion of petroleum-based diesel.

Alkylesters, in particular biodiesel, may be derived from the oils of the soybean or the rapeseed. The crude vegetable oil from these sources may be filtered, refined and subjected to several processing steps before the oil may be usable as biodiesel. Additionally, biodiesel may be derived from varying grades of vegetable oils. Such grades include virgin oil, yellow grease, used oils from food processing, or by-products from the edible oil refining process such as soap stock. Each of these sources has varying amounts of free fatty acids and/or glycerides—i.e., mono-, di-, or tri-glycerides—that may be processed into biodiesel.

Of these sources of vegetable oil, soap stock is generally considered the most cost effective source. Soap stock is derived from the crude oil extracted from the soybean or rapeseed. The crude oil of these seeds may be separated into two components: refined oil (which may then be further processed and converted into edible oil) and soap stock. The soap stock may then be acidulated with sulfuric acid to provide a composition having about 70% free fatty acids that may be further processed into biodiesel.

One contemplated method of processing the free fatty acids from these various grades of vegetable oils is the direct transesterification of the free fatty acids in the presence of alkali to produce the fatty acid alkyl esters for use as biodiesel. Such an approach, however, causes the free fatty acids to precipitate as soap, creating an additional recovery step in the contemplated method.

To avoid the precipitation problem, a two-step method for processing the free fatty acids has been proposed. This method can be found in EP 07 708 813 and WO 02/28811, and generally consists of the steps of (1) acid catalyzed esterification of free fatty acids with methanol in the presence of sulfuric acid, and (2) neutralization of the acid catalyst followed by conventional base catalyzed transesterification. These steps can be described by the following reaction scheme.

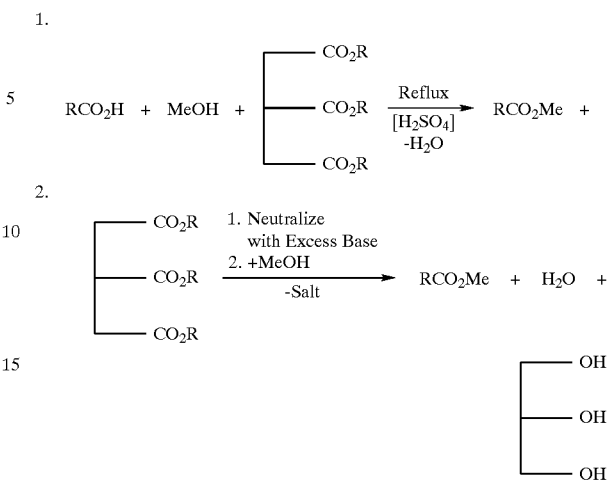

where each R may be the same or different and an aliphatic chain typically found in vegetable or animal oil sources, typically $C_8$ to $C_{22}$.

Even though transesterifications are both acid and base catalyzed, neutralization of the acid catalyst is necessary because acid catalyzed transesterifications typically exhibit slower kinetics than base catalyzed transesterifications, under comparable conditions. The disadvantages of two-step methods as disclosed in EP 07 708 813 and WO 02/28811 are the additional salt waste from neutralization, long cycle times, and a cumbersome recovery scheme of residual free fatty acids.

BRIEF SUMMARY OF THE INVENTION

It is therefore an object of the present invention to provide a method of processing free fatty acids from a vegetable or animal oil source into alky esters in which the salt and aqueous waste is reduced or eliminated.

It is a further object of the present invention to provide a method of processing free fatty acids from a vegetable or animal oil source into alkyl esters in which the cycle times are reduced.

It is a further object of the present invention to provide a method of processing free fatty acids from a vegetable or animal oil source into alkyl esters in which the recovery scheme of residual free fatty acids is conveniently performed or the need for such recovery is eliminated.

It is a further object of the invention to provide a method capable of performing esterification and transesterification simultaneously in one step.

These and other advantages are accomplished by subjecting the vegetable or animal oil source to a single step method constituting a direct transformation of the free fatty acid and glycerides of the vegetable or animal oil source with methanol. The single step process does not involve a neutralization step thus simplifying the process. The single step method is generally described below.

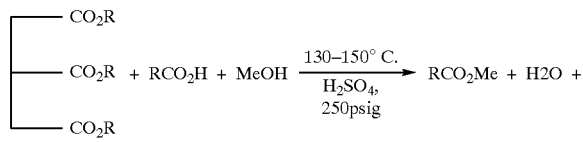

-continued

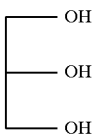

where each R may be the same or different and may be H or an aliphatic chain typically found in vegetable or animal oil sources, typically $C_8$ to $C_{22}$.

DETAILED DESCRIPTION OF THE INVENTION

Figure 1:
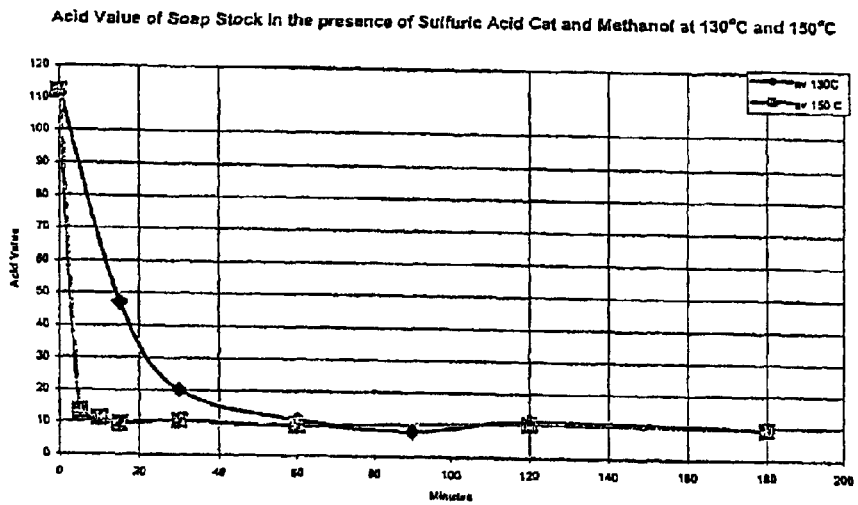
FIG. 1 shows the time for two embodiments of the present invention to reach equilibrium as determined from acid values.

As noted above, the method of the present invention of processing a vegetable oil source can be represented by the following reaction scheme.

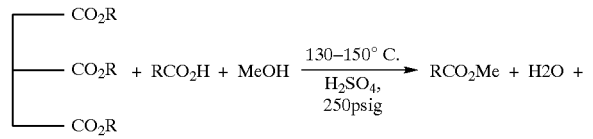

where each R may be the same or different and may be H or an aliphatic chain typically found in vegetable or animal oil sources, typically $C_8$ to $C_{22}$. The reaction scheme may be undertaken at temperatures from about 80° C. to about 200° C., preferably within the range of about 120° C. to about 180° C., and most preferably within the range of about 150° C. to about 170° C. The catalyst concentration ranges may be from about 0.0 to about 0.5 wt %, preferably within the range of about 0.1 to about 0.25 wt %. The methanol excess may range from about 1.0 equivalent to about 5 equivalents, preferably within the range of about 1.5 to about 3 equivalents. The pressure under which the reaction scheme is run is about 25 psia to about 500 psia, preferably in the range of about 100 psia to about 300 psia.

The above reaction scheme provides a method of making alky esters that provides the advantages of fast reaction times, moderate temperature and pressure requirements, and reduced overall cycle times. To demonstrate the effectiveness of the above reaction scheme of the present invention, acidulated soap stock samples were subjected to the reaction scheme and the acid value of the reaction products was determined as a function of time. The decreasing acid value demonstrated that the reaction scheme provides a satisfactory method of processing the free fatty acids of the acidulated soap stock into fatty acid alkyl esters for use, for example, as biodiesel. Further, to demonstrate that the products of the above reaction scheme compared favorably to a known biodiesel reference (obtained from the Stepan Company of Northfield, Ill.), $^1$H-NMR of both the products of the various examples of the present invention were compared to the $^1$H-NMR of the biodiesel reference. The comparison demonstrates that the products of the above reaction scheme provide products comparable to the biodiesel reference.

EXAMPLE 1

Example 1 sets forth systems in which the reaction scheme proceeded and where by-products were not removed. The acid values of the systems were measured as a function of time at two different temperatures (130° C. and 150° C.) to measure the extent of reaction. Even without the removal of the by-products, the reaction scheme of the present invention is demonstrated to provide an effective method of making biodiesel from various sources of vegetable oil.

Pressure reactions were generally carried out in a 300 ml 316 ss Parr autoclave with glass liner. The autoclave was equipped with a turbine agitator, thermocouple and cooling coil, as well as a sampling port with dip-tube. Charges were consistently kept to 100 g of acidulated soap stock, 35 g of methanol and 0.25 g to 0.3 g of 98% sulfuric acid. The reactants and catalyst were charged and the autoclave was sealed and then flushed with nitrogen. Heat-up time was 30 minutes to 130° C. and 45 minutes to 150° C. The maximum pressure at 150° C. was measured to 220 psig. Sampling was done from a sampling port. Approximately 1–2 g of sample was retrieved from the reactor into a 10 ml vial. The vial was immediately quenched in ice-water for several minutes and analyzed for acid value (AV) after evaporating residual methanol in a stream of nitrogen.

The following table shows the acid value results for two runs where the by-products were not removed and demonstrate that the reaction scheme of the present invention effectively converts the free fatty acids. FIG. 1 is a graph showing the said acid value results and graphically demonstrates that the reaction at 150° C. reaches equilibrium at 15 minutes while the reaction at 130° C. reaches equilibrium at 60 minutes.

TABLE 1

Acid values of Runs 1 and 2 over time.

| Time (min) | Run 1 -- 130° C. | Run 2 -- 150° C. |
|---|---|---|
| 0 | 112.2 | 112.2 |
| 5 |  | 13.27 |
| 10 |  | 11.33 |
| 15 | 47.19 | 9.43 |
| 30 | 20.16 | 10.54 |
| 60 | 11.14 | 9.3 |
| 90 | 7.76 |  |
| 120 | 11.15 | 10.4 |
| 180 | 9.43 | 9.35 |

Figure 2:
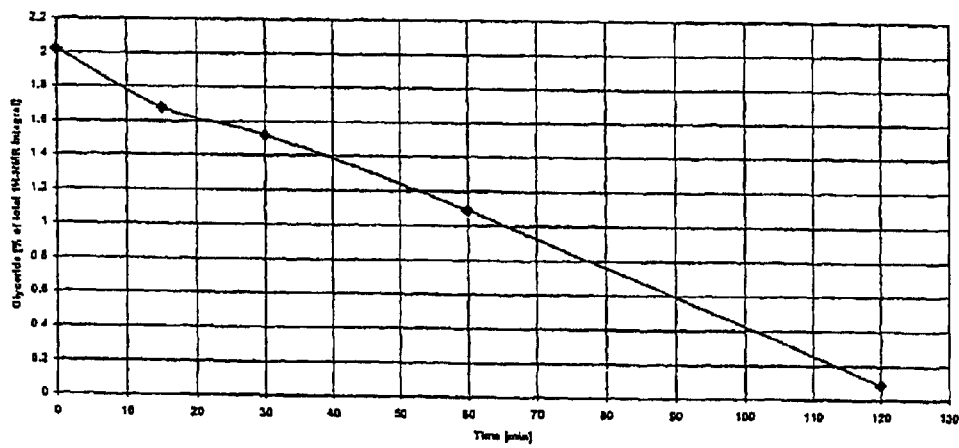
FIG. 2 shows the decreasing amount of glyceride content over time in one embodiment of the present invention.

The products of Run 1 were further analyzed to confirm the transesterification of the glycerides in the acidulated soap stock. The analysis confirmed that the glycerides are transesterified simultaneously with the conversion of free fatty acids into fatty acid alkyl esters. The following table sets forth the ratio of the glyceride $^1$H-NMR signal and the overall integration versus time. FIG. 2 shows the decreasing amount of glyceride content over time in a graphical format. Though the exact concentration of glycerides cannot be ascertained in this manner, it does show the relative decrease in concentration over time.

TABLE 2

Glyceride $^1$H-NMR integral as % of total integration for Run 1.

| Time (min.) | Run 1 -- 130° C. |
|---|---|
| 0 | 2.02 |
| 15 | 1.68 |
| 30 | 1.52 |
| 60 | 1.09 |
| 120 | 0.09 |

Figure 3:
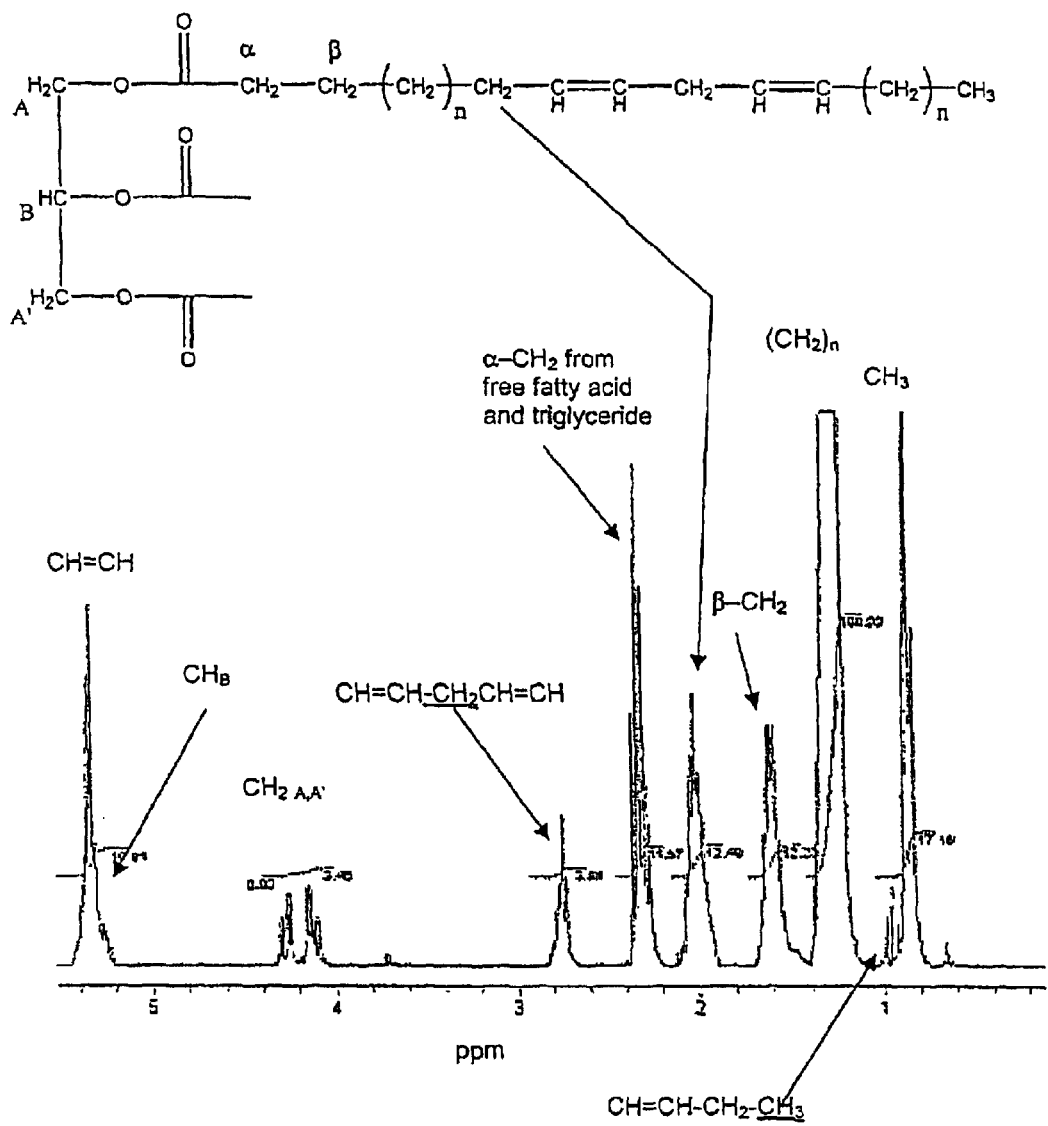
FIG. 3 shows the results for a $^1$H-NMR for acidulated soap stock.
Figure 4:
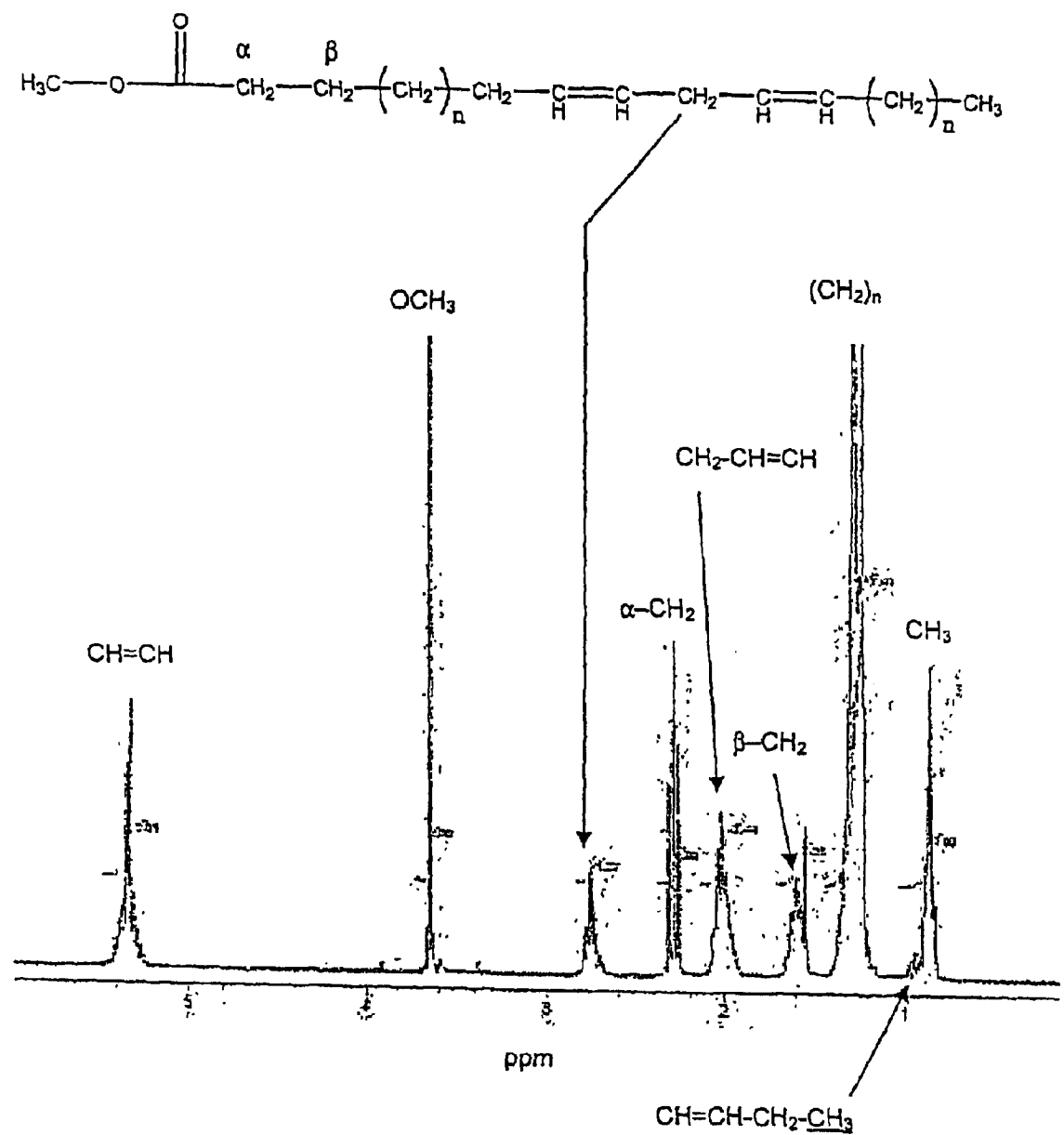
FIG. 4 shows the results for a $^1$H-NMR for a known biodiesel reference.
Figure 5:
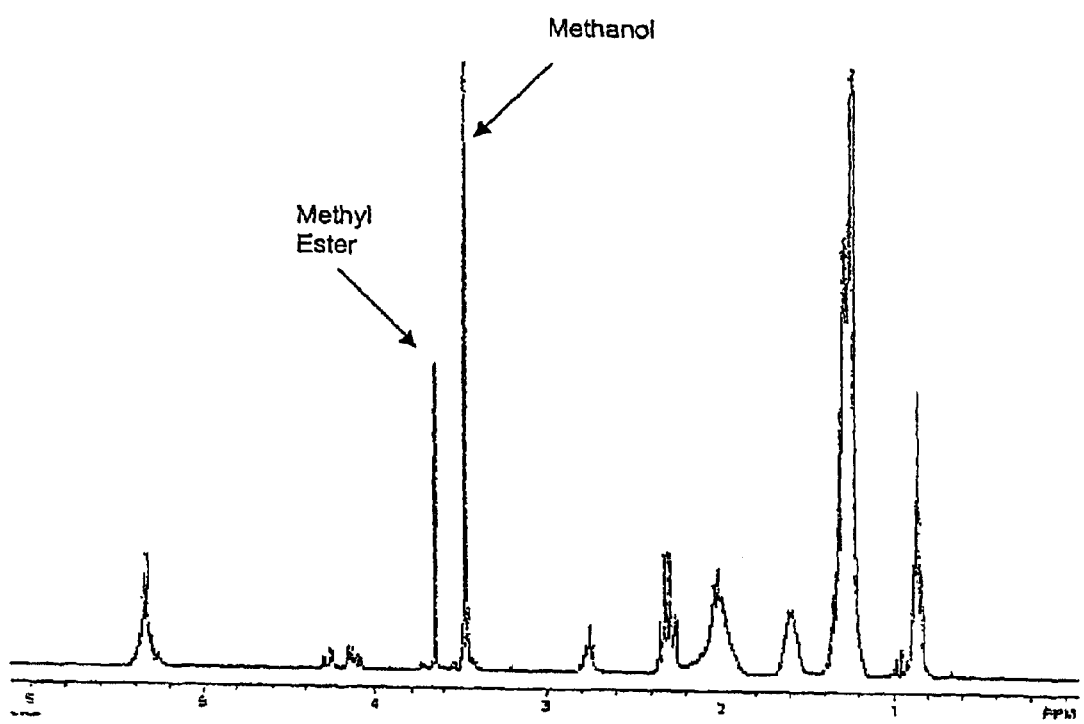
FIG. 5 shows the results for a $^1$H-NMR for one embodiment of the present invention at 15 minutes.
Figure 6:
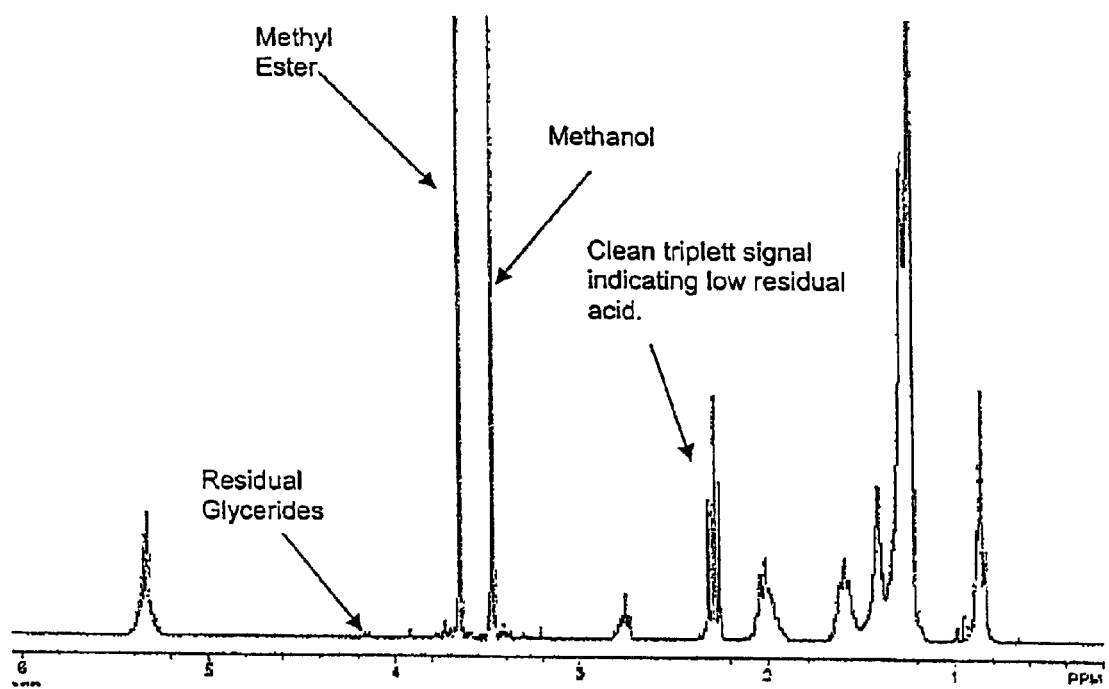
FIG. 6 shows the results for a $^1$H-NMR for one embodiment of the present invention at 120 minutes.

FIGS. 3 to 6 further demonstrate the transesterification of glycerides in Run 1. FIG. 3 shows the results for a $^1$H-NMR for acidulated soap stock. FIG. 4 shows the results for a $^1$H-NMR for a known biodiesel reference. FIG. 5 shows the results for a $^1$H-NMR for Run 1 at 15 minutes. FIG. 6 shows the results for a $^1$H-NMR for Run 1 at 120 minutes. Comparison of the graphs of FIGS. 3 through 6 illustrates the reduction in the presence of glycerides and an increase in the presence of methyl esters.

COMPARATIVE EXAMPLE

The comparative example was an acidulated soap stock subjected to the reaction scheme but under ambient pressure. The comparative example resulted in a complete conversion of the free fatty acids into fatty acid alkyl esters but the glycerides were not transesterified demonstrating the need for pressure above ambient.

90 g of acidulated soap stock together with 70 g of methanol and 0.5 g of sulfuric acid (98%) were charged into a 300 ml 3-neck round bottom flask. The flask was equipped with a mechanical stirrer, thermocouple and a reflux condenser atop a Soxhlett extractor filled with anhydrous calcium chloride. The mixture was heated by means of a heating mantle to reflux temperature (68–70° C.). Methanol was continouosly recycled through the calcium chloride bed to remove water. After 6 hrs of reflux the mixture was washed with a 10% sodium bicarbonate solution followed by twice washing with 5 wt % (with regard to ester) water. The organic layer was dried under vacuum on a Rota-Evaporate at ~60° C. A significant emulsification took place during washing, which eventually could only be dealt with by stripping the water in vacuo.

The comparative example of the esterification with methanol in the presence of sulfuric acid as the catalyst at ambient pressure lead to complete esterification of the free fatty acid after 6 Hrs (AV 0.5). However, with 1.25% (by $^1$H-NMR determined as above) glycerides remaining, the advantage of using increased pressure becomes clear.

EXAMPLE 2

Example 2 sets forth systems in which the reaction scheme proceeded and where by-products (i.e., water and glycerin) were removed. The final measured acid values of the systems demonstrated that removal of the by-products facilitates the reaction scheme.

These runs were charged as outlined in Example 1. The removal of water and glycerin during pressure reactions could not be done from the reactor itself. Instead, the reaction was quenched as quickly as possible by removing the heart source and cooling the reactor using the internal cooling coil and an external ice-water bath. After cooling to 30° C. or less the reactor was opened and the content was weighed and transferred to a 250 ml separatory funnel. After settling the water/glycerin layer was removed. Make-up catalyst (0.25 g) and methanol (5 g) were added as necessary to the remaining phase, which was then weighed and poured back into the Parr reactor, to continue the reaction.

Run 3 was carried out at 150° C. for a total time of 2.6 hours. Run 3 resulted in a final acid value of 2.5 demonstrating the improved results over Runs 1 and 2 where the by-products were not removed. Even though this acid value of 2.5 vastly improves over those of Runs 1 and 2, a more complete reaction completion is desirable. It is believed that the acid value of 2.5 is due to the residual solubility of water in the product preventing the completion of the reaction.

Run 4 was formulated to demonstrate that the presence of a dehydrating agent for removal of the dissolved water in the product drives the reaction to completion. Run 4 resulted in an acid value as low at 0.5 and a final acid value of 0.8 demonstrating that the dissolved water indeed prevented the completion of the reaction.

For Run 4, the reactor was charged according to procedure 1 (0.125 g 98% sulfuric acid) and carried out at 150° C. After 30 min the reaction was quenched as quickly as possible and the reactor content was transferred to a flask and concentrated at 50° C. to a net weight of 104 g, under vacuum. The acid value at this point was determined to be 19.6. The concentrate was returned to the reactor with 35 g of methanol and 5.0 g of anhydrous sodium sulfate. The reaction was continued at 150° C. for 1 hr, after which the reaction was quenched and concentrated as before. The acid value at this point was 2.0. This procedure was repeated twice more to a final acid value of 0.54. The product was then washed twice with DI water and dried under vacuum for 1 hour at 60° C. The final acid value was determined to 0.8.

Run 5 was run at 180° C. and demonstrated that the higher temperature of 180° C. did improve the reaction time over Runs 1 and 2.

For Run 5, the reactor was charged according to procedure 1, with 100.0 g soap stock, 35.0 g methanol and 0.25 g sulfuric acid. The autoclave was heated to 180° C. within 45 minutes and held at this temperature for 30 minutes, before being quenched. The content was transferred to a separatory funnel and 14.29 g of bottom phase were removed. The remaining amount was brought back to the autoclave and heating at 180° C. continued for 60 minutes. The reaction was cooled again and a total of 10.83 g was removed after separation. The remaining phase was washed twice with 25 g of water, and finally dried under vacuum at 60° C. The resulting acid value was 6.3.

The following table summarizes the conditions and results for Runs 3, 4, and 5.

TABLE 3

Reaction summary for Runs 3, 4, and 5.

|  | Temp (° C.) | Total Time [hrs] | Soap Stock [g] | Methanol [g] | 98% Sulfuric Acid [g] | Final AV [meq/g] | Glycerin Phase [g] | Yield (based on g soap stock) [g] |
|---|---|---|---|---|---|---|---|---|
| Run 3 | 150 | 2.6 | 100.0 | 35.0 | 0.25 | 2.5 | 23.73 | 89.2 |
| Run 4 | 150 | 4.5 | 100.1 | 35.0 | 0.125 | 0.8 | n.d. | 92.5 |
| Run 5 | 180 | 1.5 | 100.0 | 35.0 | 0.25 | 6.3 | 25.12 | 90.6 |

(n.d. = not determined)

Figure 7:
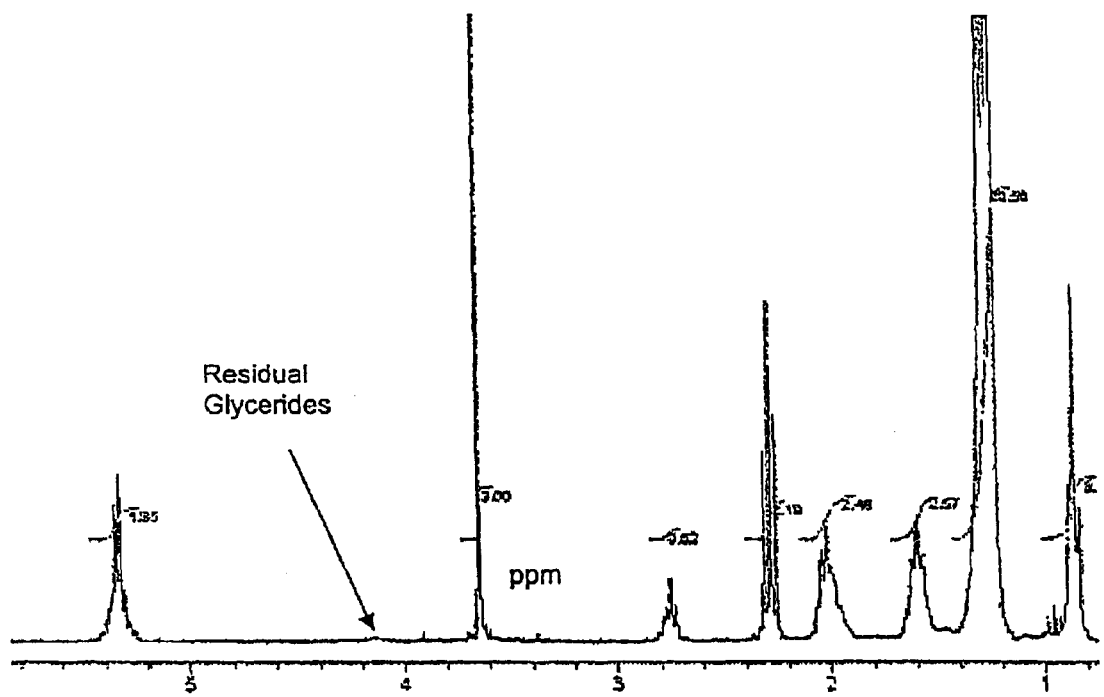
FIG. 7 shows the results for a $^1$H-NMR for one embodiment of the present invention.
Figure 8:
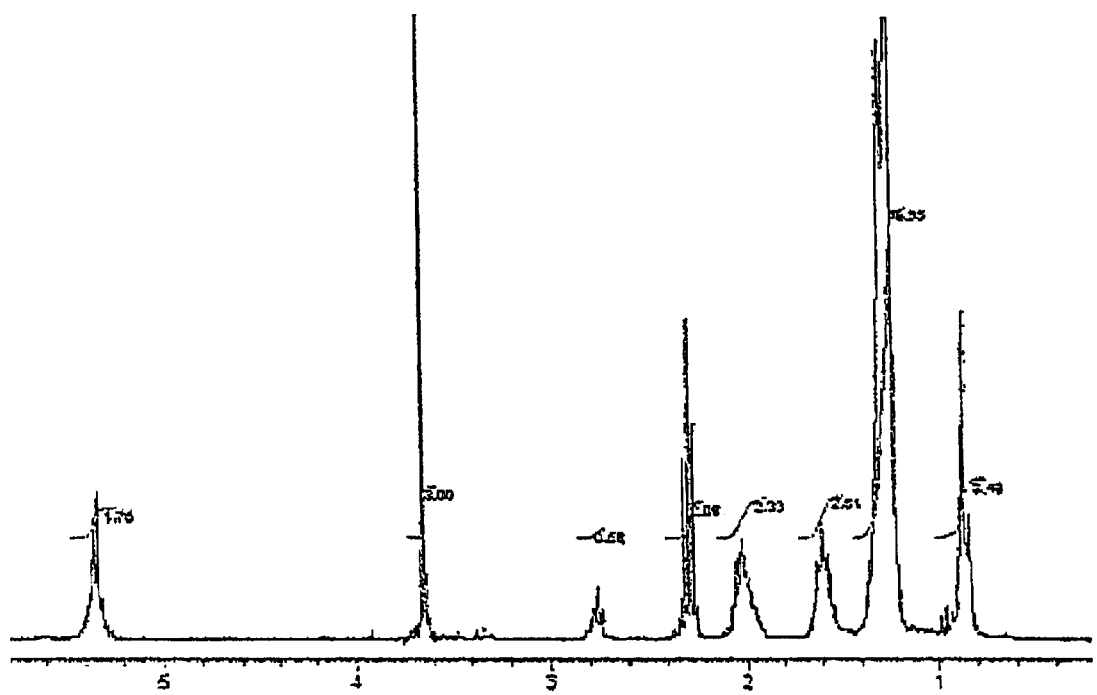
FIG. 8 shows the results for a $^1$H-NMR for one embodiment of the present invention.

FIGS. 7 and 8 show the results for a $^1$H-NMR for Runs 4 and 5, respectively. FIGS. 7 and 8 did not reveal any side reactions taking place under the conditions of the reaction scheme, indicating that the reaction scheme of the present invention may be the subject of a continuous process. Additionally, FIG. 8 confirms that the higher reaction temperature of Run 5 does not have a negative effect as far as decomposition is concerned.

While particular elements, embodiments and applications of the present invention have been shown and described, it will be understood that the invention is not limited thereto since modifications may be made by those skilled in the art, particularly in light of the foregoing teachings. Therefore, it is understood that the embodiments described above are merely for illustrative purposes and are not intended to limit the spirit and scope of the invention, which is defined by the following claims as interpreted according to the principles of patent law, including the doctrine of equivalents.

What is claimed is:

1. A method of making alky ester comprising the following steps:
   providing a vegetable oil source, the vegetable oil source including free fatty acids and/or glycerides;
   providing methanol in an excess between about 1.0 equivalent to about 5 equivalents;
   mixing the methanol and vegetable oil source in the presence of a catalytic acid in an amount between about 0.0 to about 0.5 wt %;
   heating the mixture to a temperature of between about 80° C. to about 200° C.;
   maintaining the pressure of the heated mixture between about 25 psia to about 500 psia;
   reacting the methanol and the free fatty acids and/or glycerides for an effective conversion of the free fatty acids and/or glycerides into fatty acid alkyl esters;
   recovering the fatty acid alkyl esters.

2. The method of claim 1 wherein the heating is to a temperature of about 120° C. to about 180° C.

3. The method of claim 2 wherein the heating is to a temperature of about 150° C. to about 170° C.

4. The method of claim 1 wherein catalytic acid is present in an amount between about 0.1 to about 0.25 wt %.

5. The method of claim 1 wherein the methanol is provided excess may range from about 1.5 to about 3 equivalents.

6. A method of making alky ester comprising the following steps:
   providing a vegetable oil source, the vegetable oil source including free fatty acids and/or glycerides;
   providing methanol in an excess between about 1.5 equivalent to about 3 equivalents;
   mixing the methanol and vegetable oil source in the presence of a catalytic acid in an amount between about 0.1 to about 0.25 wt %;
   heating the mixture to a temperature of between about 150° C. to about 170° C.;
   maintaining the pressure of the heated mixture between about 25 psia to about 500 psia;
   reacting the methanol and the free fatty acids and/or glycerides for an effective conversion of the free fatty acids and/or glycerides into fatty acid alkyl esters;
   recovering the fatty acid alkyl esters.

7. A method of making alky ester comprising the following steps:
   providing a soap stock, the soap stock including free fatty acids and/or glycerides;
   providing methanol in an excess between about 1.5 equivalent to about 3 equivalents;
   mixing the methanol and soap stock in the presence of a catalytic acid in an amount between about 0.1 to about 0.25 wt %;
   heating the mixture to a temperature of between about 150° C. to about 170° C.;
   maintaining the pressure of the heated mixture between about 25 psia to about 500 psia;
   reacting the methanol and the free fatty acids and/or glycerides for an effective conversion of the free fatty acids and/or glycerides into fatty acid alkyl esters;
   recovering the fatty acid alkyl esters.

8. The method of claim 7 wherein the soap stock is acidulated soap stock.

9. The method of claim 1 further comprising the step of removing by-product of the reaction between the methanol and the free fatty acids and/or glycerides while the reaction is proceeding.

10. The method of claim 1 wherein the pressure is maintained between about 100 psia and 300 psia.

* * * * *